United States Patent [19]

Sinnhuber

[11] Patent Number: 5,238,263
[45] Date of Patent: Aug. 24, 1993

[54] LATERAL HEAD PROTECTION ARRANGEMENT FOR A VEHICLE OCCUPANT

[75] Inventor: Ruprecht Sinnhuber, Gifhorn, Fed. Rep. of Germany

[73] Assignee: Volkswagen AG, Wolfsburg, Fed. Rep. of Germany

[21] Appl. No.: 849,493

[22] Filed: Mar. 11, 1992

[30] Foreign Application Priority Data

Mar. 13, 1991 [DE] Fed. Rep. of Germany ....... 4108052

[51] Int. Cl.$^5$ ............................................. B60R 21/06
[52] U.S. Cl. ................................................... 280/730
[58] Field of Search .............. 280/730 A, 730 R, 727, 280/728 R, 728 A, 732, 736, 748, 751; 296/63, 68.1, 152

[56] References Cited

U.S. PATENT DOCUMENTS

| | | | |
|---|---|---|---|
| 3,806,152 | 4/1974 | Witchger | 280/751 |
| 3,885,810 | 5/1975 | Chika | 296/68.1 |
| 3,897,961 | 8/1975 | Leising et al. | 280/730 A |
| 3,981,520 | 9/1976 | Pulling | 280/730 A |
| 4,946,191 | 8/1990 | Putsch | 280/720 A |
| 5,033,236 | 7/1991 | Szerdahelyi et al. | 280/730 A |

FOREIGN PATENT DOCUMENTS

| | | |
|---|---|---|
| 0305655 | 3/1989 | European Pat. Off. . |
| 1555142 | 7/1970 | Fed. Rep. of Germany . |
| 2212190 | 9/1973 | Fed. Rep. of Germany . |
| 2628815 | 1/1978 | Fed. Rep. of Germany . |
| 3716168 | 11/1988 | Fed. Rep. of Germany . |

*Primary Examiner*—Jesûs D. Sotelo
*Assistant Examiner*—Stephen P. Avila
*Attorney, Agent, or Firm*—Brumbaugh, Graves, Donohue & Raymond

[57] ABSTRACT

A lateral head protection arrangement for protecting a vehicle occupant from injuries due to hard parts of a vertically adjustable articulation structure for a safety harness includes a harness support pin in the articulation structure which supports an air bag on the side toward a vehicle occupant and a gas generator disposed with a locking rail in the B-column of the vehicle body. Thus, the air bag is positioned between the vehicle occupant and the articulation structure in all vertical positions of the harness support pin.

3 Claims, 1 Drawing Sheet

LATERAL HEAD PROTECTION ARRANGEMENT FOR A VEHICLE OCCUPANT

BACKGROUND OF THE INVENTION

This invention relates to arrangements for providing lateral head protection for a vehicle occupant.

As is known, the protection of vehicle occupants during lateral collision accidents presents difficulty because there is no room in the lateral direction for protective devices designed to absorb energy by collapsing over a substantial distance. In this respect, "air bags" perform well, since they occupy very little space during normal operation, leaving almost the whole volume of the passenger compartment available for the occupants, whereas in an accident they expand into the passenger compartment upon activation of a gas supply to form a cushion. Accordingly, German Offenlegungsschrift No. 15 55 142 taught at an early date how vehicle occupants might be protected from dangerous parts such as door posts, roof frames etc., during an accident by providing spatially limited air-bag elements lining the walls of the vehicle interior in the form of a continuous padding. German Offenlegungsschrift No. 26 28 815 describes a safety device having an air bag serving as a head-restraining element which is connected for equal and simultaneous forward displacement with a restraining system including a safety belt harness for the occupant's upper body. Thus, this disclosure assumes a frontal crash with forward displacement of the harness so that the air bag positioned laterally adjacent to the occupant's head remains next to the occupant's head throughout impact resulting from the accident.

The prior art also discloses many types of collision sensors to be mounted on the outside wall of a vehicle for activation of the air bag. Such disclosures are included, for example, in German Offenlegungsschrifts Nos. 22 12 190 and 37 16 168 as well as European Patent No. 0 305 655 A2.

Many modern safety belt systems have vertically adjustable articulation arrangements located in the region of the B- or C-column of the motor vehicle, providing an upper loop for the shoulder harness. The vertical adjustment provides an adjustment to position the safety belt according to the location of the seated occupant of the vehicle.

SUMMARY OF THE INVENTION

Accordingly, it is an object of the present invention to provide a lateral head protection arrangement for motor vehicle occupants which overcomes the disadvantages of the prior art.

Another object of the invention is to provide a lateral head protection arrangement of this kind which will protect an occupant's head from injury by hard parts of a vertically adjustable safety harness articulation structure during side collision of the vehicle.

These and other objects of the invention are attained by providing a harness articulation structure which includes a harness articulation pin which is vertically adjustable in a locking rail, an air bag disposed between the pin and the position of a seated passenger, and a gas generator disposed adjacent to the air bag and on the opposite side of the locking rail therefrom. The vertically adjustable articulation arrangement thus includes a pin and a locking track having a vertical recess in which the pin may be positioned at various elevations where it may be locked in the track by a locking device. Because of the location of the air bag between the pin and the vehicle occupants, the air bag shields the pin in relation to an occupant's head in every vertical position of the pin. Thus, contrary to the arrangement disclosed in the above-mentioned Offenlegungsschrift No. 26 28 815, the pin is not a part that is displaced only during a frontal impact of the vehicle, but instead is a part which normally maintains a fixed location once locked in position. In particular, the pin does not change its location in the longitudinal direction of the vehicle in the event of an accident. Since the vertically adjustable pin forms the support for the air bag according to the invention, the air bag is always located at the danger level between the pin and the vehicle occupant in a lateral collision.

Other components of the head protection arrangement may at the same time be included in the vertically adjustable articulation structure, while, on the other hand, parts of the articulation structure may also be utilized to assist in head protection of the vehicle passenger.

BRIEF DESCRIPTION OF THE DRAWINGS

Further objects and advantages of the invention will be apparent from a reading of the following description in conjunction with the accompanying drawings, in which.

DESCRIPTION OF PREFERRED EMBODIMENTS

Figure 2:
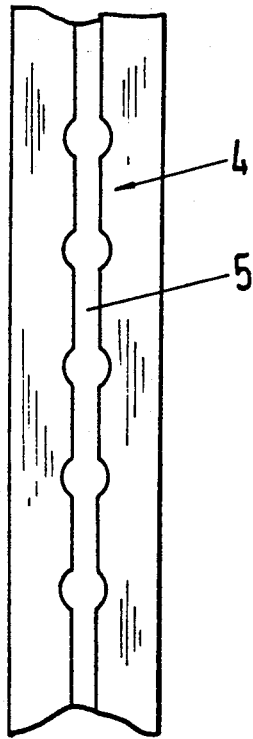
FIG. 2 is a fragmentary plan view of a locking rail for the harness articulation structure shown in the embodiment of FIG. 1.
Figure 1:
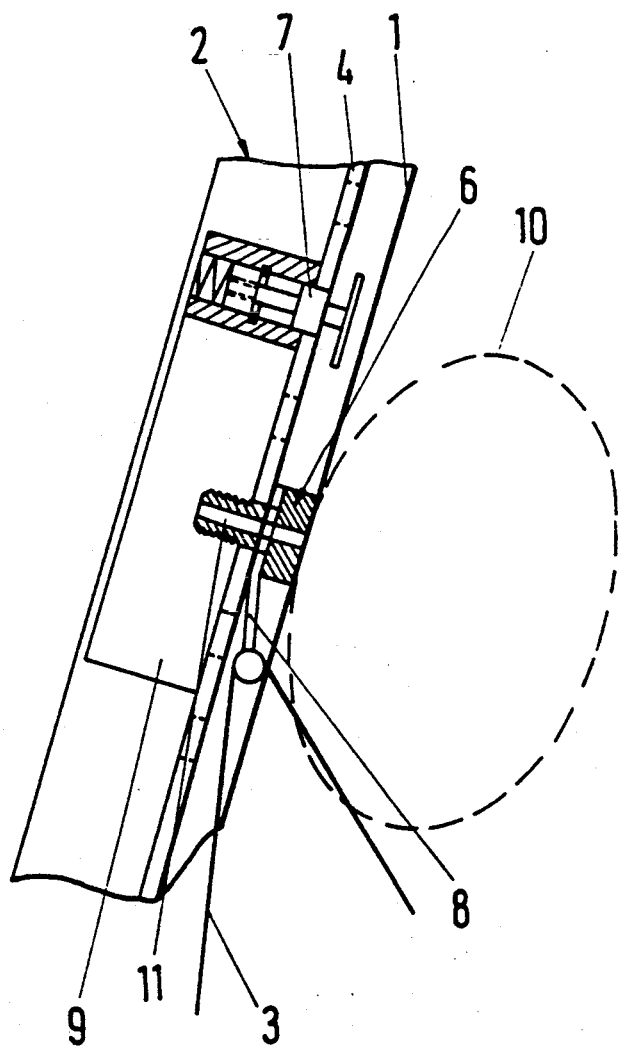
FIG. 1 is a schematic vertical sectional view of, for example, the A-column of a motor vehicle showing a representative embodiment of a lateral head protection arrangement according to the invention.

In the typical embodiment shown in FIG. 1, a B-column 2 of a motor vehicle has a covering 1 on the interior side facing the location of a passenger. A safety belt harness 3 has an articulated support structure including a locking rail 4 having a vertical slot 5 traversed by a pin 6 and having circular enlargements at intervals to receive a correspondingly shaped spring-biased locking member 7 which supports the upper loop of the safety harness 3. The pin 6 is screwed into a gas generator 9 for an air bag 10, shown in dash outline in the inflated condition. The air bag, which is normally kept flat beneath the covering 1, is supported by the pin 6 and is therefore always located at the optimum level. The gas generator 9, which moves with the pin 6 on the other side of the track 4, thus forms a slide block preventing the pin 6 from slipping out of the slot 5.

A passage 11 through the pin 6 provides a communicating line between the gas generator 9 and the air bag 10. Thus the gas generator 9 forms a component of the vertically adjustable harness articulation structure, while conversely the pin 6 of the articulation structure is also a component of the lateral head protection arrangement which includes the air bag 10. This arrangement, of course, may also be used in harness support structures in which the harness support pin is not vertically adjustable.

The invention thus provides head protection for a vehicle occupant that will largely prevent head injuries resulting from contact with hard parts of a vertically adjustable safety belt articulation structure at any vertical position thereof.

Although the invention has been described herein with reference to a specific embodiment, many modifications and variations therein will readily occur to those skilled in the art. Accordingly, all such variations are included within the intended scope of the invention.

I claim:

1. A lateral head protection arrangement for a vehicle occupant comprising a vertically adjustable articulation structure for a safety harness including a support pin movable in a locking rail adjacent to the location of a vehicle occupant, an air bag movable with the pin and arranged to be interposed between the pin and the vehicle occupant when inflated, and a gas generator connected to the air bag and disposed on the opposite side of the locking rail from the air bag.

2. A lateral head protection arrangement according to claim 1 wherein the gas generator comprises a slide block affixed to the end of the support pin.

3. A lateral head protection arrangement according to claim 2 wherein the support pin includes a passage providing communication between the gas generator and the air bag.

* * * * *